US005193305A

United States Patent [19]
Holtkamp, Jr.

[11] Patent Number: 5,193,305
[45] Date of Patent: Mar. 16, 1993

[54] WICK INSERTION DEVICE FOR A PLANT POT

[76] Inventor: Reinhold Holtkamp, Jr., 1501 Lischey Ave., Nashville, Tenn. 37207-8565

[21] Appl. No.: 783,773

[22] Filed: Oct. 29, 1991

[51] Int. Cl.$^5$ .............................................. A01G 27/00
[52] U.S. Cl. .................................................... 47/81
[58] Field of Search ......................... 47/81, 79, 59, 62

[56] References Cited
U.S. PATENT DOCUMENTS
4,932,159  6/1990  Holtkamp, Sr. ...................... 47/81

Primary Examiner—David A. Scherbel
Assistant Examiner—Joanne C. Downs
Attorney, Agent, or Firm—Foley & Lardner

[57] ABSTRACT

A self-locking insertion device for a water-transmitting wick for a potted plant adapted to be watered by the wick through capillary action from a water supply, the device including a generally flat, elongated, transversely flexible and resilient main body portion having opposed walls and formed at its upper end with a slot for frictionally retaining the wick which extends therefrom into growing media in the pot. The device further includes a flexible, resilient base portion integrally formed with said main body portion and having a lateral dimension greater than a bottom opening in the pot and generally flat top flanges adapted to engage the bottom surface of the bottom wall of the pot around the opening in the pot when the device is mounted. The base is formed with an enlarged opening to receive the wick and a narrow slot extending from the opening to the exterior of the base at the bottom thereof and through which the wick can be inserted toward the opening. Opposed grooves at the juncture of the main body position and base define a neck area which is smaller in dimension than the pot opening. When the device, with the wick mounted thereon, is moved upwardly through the pot opening, the walls of the body resiliently flex inwardly to clear the opening until the wall of the pot around the opening extends into said grooves.

7 Claims, 1 Drawing Sheet

WICK INSERTION DEVICE FOR A PLANT POT

BACKGROUND OF THE INVENTION

The present invention relates as indicated to a wick insertion device for a plant pot, and relates more particularly to a device which is adapted to carry a wick and which can be locked in position in an opening formed in a bottom wall of the pot. The wick is water-transmitting by capillary action from a water supply in which the wick is immersed to growing media in the plant pot.

In application Ser. No. 281,622, filed Feb. 9, 1988, of Reinhold Holtkamp, Sr., which is incorporated herein by reference, a watering container is disclosed specifically adapted to receive and provide adequate moisture for miniaturized plants, for example African violets. The container is constructed and arranged such that the miniature pot is received centrally in the upper section of the container, with the lower section defining a reservoir for a source of water supply. The term "water" in the context of the present invention will be understood as comprising water, water to which fertilizer or nutrients have been added, or any other liquid which is beneficial to plant growth and which can be transported by capillary action.

Since the container described in Ser. No. 281,622 is always positioned above the upper level of the water in the reservoir, at least one wick is provided the lower end of which is immersed in the water and the upper end of which extends through an opening in the plant pot and into the growing media. In this manner, water is transported by capillary action from the reservoir to the medium, with African violet plants in particular benefiting from bottom watering of this type.

Although the plant watering container described in Ser. No. 281,622 has had widespread commercial acceptance, the insertion and retention of the wick in the growing medium was a continuing problem. As a result, a wick insertion device described in U.S. Pat. No. 4,932,159, of Reinhold Holtkamp Sr. was developed, and is herein incorporated by reference. The patented wick insertion device comprises a generally flat base, the inside surface of which engages the bottom surface of the bottom wall of the pot, and a stem extending upwardly from the base and through an opening in the bottom wall of the pot. A plurality of reinforcing ribs extend radially from the stem, and the stem is formed at the top thereof with a transverse groove to frictionally receive the wick near its upper end for retaining the same in the growing medium. A radial slot is formed in the base for receiving the intermediate part of the wick, with projections being formed in the slot defining a gap through which the wick can be inserted so as to maintain the intermediate portion of the wick near the stem. The lower end of the wick is immersed in the water supply.

Although the wick insertion device disclosed in U.S. Pat. No. 4,932,159 has also enjoyed widespread acceptance and use, the design does have certain disadvantages. It is preferably of molded plastic material and the wick-receiving features of the device are proportioned corresponding to the size of the device. Thus, in the smallest devices, the upper groove formed in the stem is necessarily quite small which in turn limits the size of wick which can be frictionally contained in the grove. In addition, the ribs must be made with some concern for tolerance since the device is frictionally retained in place due to the frictional engagement of the ribs with the walls of the opening in the bottom wall of the plant pot. This necessarily means that for a given opening in the bottom wall of the pot, a corresponding insertion device must be used. The drainage holes normally provided in the bottom wall of the pot frequently do not correspond to the size of the device, thereby requiring that supplemental holes be drilled or otherwise formed in the pot to receive the insertion device.

Alternatively, in order to accommodate a range of opening sizes in the pot bottom wall, different size wick insertion devices can be provided. However, this not only increases production costs per unit but requires that an inventory of different size insertion devices be maintained. From a marketing or assembling standpoint, this is a decided inconvenience and added cost without compensating value. Moreover, where a greater range of sizes is provided, a decision must be made as to the relative sizes of the upper groove formed in the stem, and the radial slot formed in the base of the device. Normally, a larger device would be formed with a larger slot and groove although this correlation does not always provide the best and most efficient water supply to the plant. If different size grooves and slots were formed in the same size device, this would even further add to manufacturing costs and inventory problems.

SUMMARY OF THE INVENTION

With the above in mind, the primary object of the present invention is to provide a wick insertion device which is adaptable to a wide range of opening sizes in the bottom wall of the pot and to various diameter wicks. This universality permits only one or at most a few different size devices to be used, thereby reducing manufacturing and inventory costs.

A further objective of the invention is to provide a wick insertion device which can be manufactured inexpensively while at the same time providing all of the required characteristics, including firm wick retention, and the ability of the device to be firmly mounted in the opening in the bottom wall of the pot.

In accordance with the invention, the wick insertion device comprises an elongated generally flat main body portion terminating at its lower end in a base having a greater width or lateral dimension than the width of the main body portion adjacent to the base. The base includes top flanges which are adapted to engage the bottom surface of the bottom wall of the pot when the wick insertion device is mounted. The juncture of the main body portion with the base is partially defined by opposed lateral grooves, the dimension of which is such that the bottom wall portion immediately surrounding the opening in the pot extends into said grooves thereby locking the device in place with the main body portion extending upwardly into the pot.

An important feature of the invention is the lateral flexibility of the device. The device is made of a flexible, resilient plastic material of any suitable type, and the main body portion is a very shallow V-shape in cross section. The legs which form either side of the main body portion merge into a longitudinal reinforcing rib that runs longitudinally centrally of the main body portion. This rib, which reinforces the relatively thin main body portion, also serves as a hinge axis about which either leg can pivot during insertion of the device into the pot, as will be hereinafter described. This ability to be laterally compressed permits the main body portion to be received in bottom wall openings of various sizes.

The invention is further characterized by a slot in the upper end of the main body, a slot in the outer end of the base, and a generally circular opening formed in the base which communicates with the adjacent slot. The opening in the base is of a sufficient size so that it can accommodate at least a double thickness of the wick, with the adjoining slot, due to its width, preventing the wick moving outwardly of the opening to the exterior of the base. The wick is thus retained in the device by means of the top slot in the main body portion and the opening in the base, with the total length of the wick and the manner in which it is secured in the device determining the amount of wick immersed in the water supply and the amount of wick exposed to the growing media. By varying the length of the wick, the amount of water supplied to the plant can be varied as desired, depending upon the optimum needs for the plant.

A further feature of the invention is its simplified construction and inexpensive manufacturing costs. The device is thin and essentially flat, and can be formed by stamping in a very inexpensive manner. This, combined with its flexibility and adaptation to various size bottom wall openings and wicks, permits substantial savings to be achieved on a per unit basis.

These and other objects will be apparent as the following description proceeds in particular reference to the application drawings.

DETAILED DESCRIPTION OF THE PREFERRED EMBODIMENTS

Figure 1:
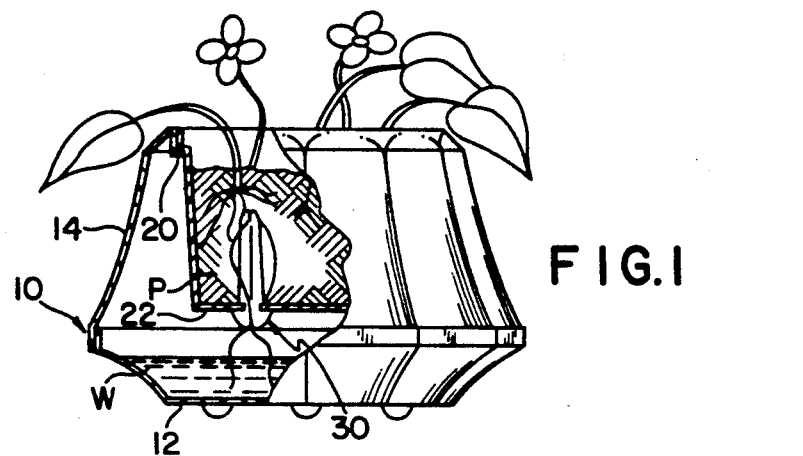
FIG. 1 comprises a side elevational view, partly in section, of a container and supported pot, with the container and pot being shown broken away to illustrate the mounting of the wick insertion device on the bottom wall of the pot.
Figure 2:
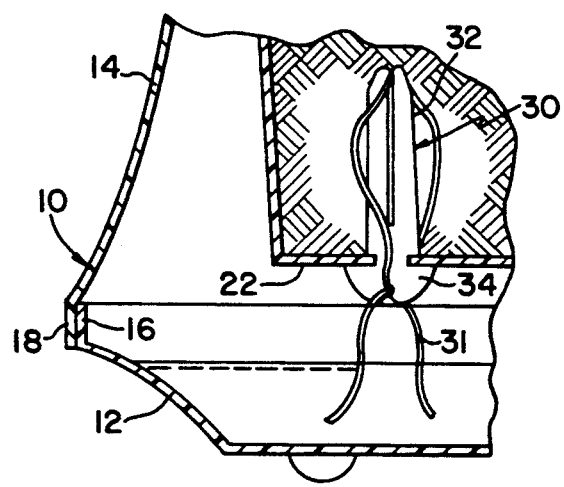
FIG. 2 is an enlarged portion of FIG. 1 showing more clearly the wick insertion device.

Referring now in more detail to the application drawings, in which like parts are indicated by like reference numerals, and initially to FIGS. 1 and 2, a container assembly is generally indicated at 10 and in the form shown comprises a lower section 12 and an upper section 14 each having mating outer flanges 16 and 18, respectively, which permit the sections to be assembled as shown in FIG. 1. Formed in the open upper end of the section 14 is a pot supporting flange 20, generally L-shaped in cross section, adapted to receive and support a pot P containing growing media and a plant, both schematically represented.

The lower section 12 of the container assembly defines a reservoir for receiving water W, with the vertical dimensions of the sections being such that the bottom wall 22 of the pot is always elevated above the water supply. To permit water to be supplied to the plant, the wick insertion device of the present invention, generally indicated at 30, is provided for receiving the wick 31, which is shown extending downwardly immersed in the water supply.

Referring now to FIGS. 3-6, the wick insertion device comprises a main body portion 32 having legs 32a and 32b, and an integrally formed base portion 34. A reinforcing rib 36 extends longitudinally centrally of the main body portion from a point near the top of the body to a point well above the base. The reinforcing rib 36 tends to rigidify the relatively thin body while at the same time providing a pivot axis about which the opposed legs 32a and 32b can rotate for laterally compressing the main body when the same is inserted through an opening in the bottom wall of the pot. Such opening is shown at 38 in FIG. 3 and is defined by a circular wall 40 formed in the bottom wall 22 of the pot.

Figure 3:
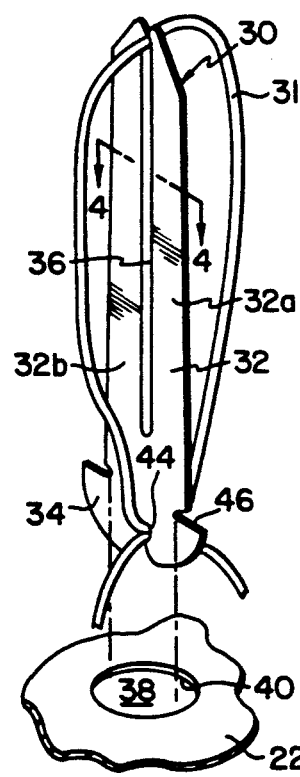
FIG. 3 is an exploded of the view of the wick insertion device positioned above the opening in a typical bottom wall of a plant pot, with the device receiving a looped wick.
Figure 5:
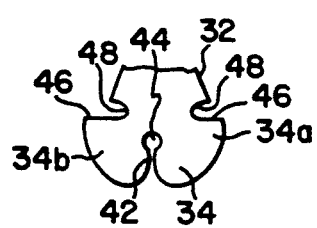
FIG. 5 is a fragmentary view showing the base portion of the device in greater detail.
Figure 4:
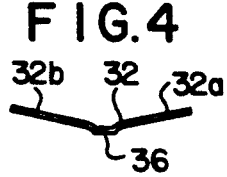
FIG. 4 is a sectional view taken on line 4—4 of FIG. 3, and showing the shallow-V cross sectional shape of the main body of the device.

As can be seen in FIG. 4, the legs 32a and 32b of the main body 32 are slightly inclined relative to a flat plane coincident with the rib 36, thereby forming a relatively large obtuse angle. This, together with the flexible resilient nature of the plastic material from which the device is made, permits the legs 32a and 32b to be moved laterally inwardly toward each other and about the axis of the rib 36 to effectively control the width of the body. As can be seen both in FIGS. 2 and 3, the body 32 tapers from its point of greatest width near the base to the opposed end thereof, to facilitate entry of the body through the pot opening as will be hereinafter described.

The base 34 includes segments 34a and 34b which are mirror images of each other and separated by a slot 42 which extends from the exterior of the base to a generally circular opening 44. The segments 34a and 34b are bevelled at their adjacent, lower edges to form a relatively shallow V entrance area to facilitate movement of the wick through the slot 42 to the opening 44. Each segment 34a and 34b is formed with a flat top flange 46 which is adapted to engage the bottom surface of the bottom wall 22 when the wick insertion device is positioned for use.

Opposed grooves 48 are formed at the juncture of the main body 32 and the base 34 thereby providing a reduced diameter neck portion which is positioned in the opening 38 as shown in FIGS. 1 and 2. The depth of the grooves 48, and consequently the width of the neck, is selected to accommodate a wide variety of opening sizes in the pot bottom wall, while at the same time not significantly impairing the strength or integrity of the device in the neck region. This is particularly important inasmuch as the bottom of the main body 32 is laterally flexed as the device extends upwardly through the opening.

Figure 6:
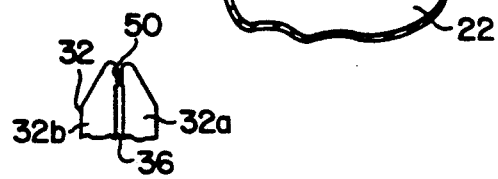
FIG. 6 is a fragmentary side elevational view showing the opposed end of the main body portion in greater detail.

Referring to FIG. 6, the uppermost ends of the leg portions 32a and 32b are spaced from each other immediately above the top of the rib 36 to form a slot 50 into which the wick can be frictionally inserted and retained. The width of both slots 42 and 50 is equal to or slightly less than the diameter of the wick whereby the wick can be forcibly moved through the slots and frictionally retained in the top of the insertion device and in the opening 44 in the base. The outer tips of the leg portions of 32a and 32b are bevelled as shown to similarly provide a generally V shaped entry area to facilitate the insertion of the wick in the top slot.

The unique configuration of the device permits the same to be manufactured from a relatively thin and flat strip of flexible, resilient plastic material of any suitable type. During stamping, the opening 44 and slots 42 and 50 can be formed, and the longitudinal central part of the main body portion is offset to form the rigidifying rib 36. The device can therefore be manufactured very inexpensively while at the same time providing the desired adaptability to varying size pot openings.

In the use of the device, the wick 31 is mounted on the device by first inserting the wick near its midpoint in the top slot 50. One end of the wick is then moved upwardly through the slot 42 in the base into the opening 44, with the other end thereafter similarly being forced through the slot 42 into the opening 44. The diameter of the opening 44 is such that both wick ends can be accommodated therein. The length of the wick is selected such that the opposed ends extend downwardly from the base for immersion in the water supply.

It will be noted that the length of wick disposed in the media can be varied by enlarging or reducing the size of the loop formed around the main body portion of the device. The size of the loop in turn controls the length of the opposed free ends of the wick which are immersed in the water supply. For example, a very tight loop wherein the wicks extend closely adjacent to the opposed sides of the main body portion will leave relatively longer end portions extending below the base whereby a greater total length of wick is immersed in the water supply. Since water is transported to the growing media by capillary action, the water supply in that instance would be increased. Conversely, if the loop is enlarged, the exposed end portions are correspondingly shortened and the total length of the wick immersed will be less.

After the wick has been positioned on the wick insertion device, the upper end of the device is inserted upwardly through the opening 38 formed in the bottom wall of the pot. Depending upon the diameter of the hole and the width of the main body 32, the tapered configuration of the main body will eventually result in the side edges of the main body engaging the wall 40 defining the opening 38. At that point, continued upward movements of the device through the opening will cause laterally inward flexure of the legs 32a and 32b to permit continued upward movement of the device. The amount of flexure will of course depend on the width of the main body compared to the diameter of the opening.

Continued upward movement will eventually align the wall 40 defining the opening 38 with the grooves 48 formed at the juncture of the main body and the base, at which time the laterally inward flexure of the legs 32a and 32b will be released and the legs will resiliently move to their relaxed position as shown in FIG. 4. The top edges of the grooves 48 will then immediately overlie the surface surrounding the opening in the pot, and the top flanges 46 of the base will engage the bottom surface of the pot in the region around the opening 38. The height of the grooves 48 is selected such that some variation in pot thickness can be accommodated.

The device is adaptable not only to different size pot openings, but also different diameter wicks, or wicks which are inserted on the device in a different configuration than shown in FIG. 3. For example, the size of the opening 44 and the depth of the top slot 50 could be selected so as to receive a double looping of the wick, thereby positioning three wick diameters in the opening 44 and a double wick thickness in the top slot 50. This permits a substantially greater length of wick to be employed thereby increasing the water transporting capabilities of the device. Wicks of greater or lesser diameter can also be accommodated. The widths of the slots 42 and 50 are such that even relatively small diameter wicks must be frictionally moved through the slots 42 and 50. The flexible nature of the plastic material from which the device is made permits the walls defining the slots 42 and 50 to be resiliently flexed apart to receive and frictionally retain a wide variety of wick diameters.

If it is desired to change the wick, the wick in place can be quickly and easily disassembled simply by moving the opposed ends downwardly through the slot 42, and the intermediate part of the wick upwardly out of slot 50. A wick possibly of different diameter and/or material can then be installed in the manner described. The material from which the wick is made forms no part of the present invention and it will be understood that the wick can be formed of various materials capable of achieving the desired capillary action. Fibrous or synthetic string-like material has proved very satisfactory in use.

It will be understood that the above-described embodiments of the invention are illustrative only and modifications thereof will occur to those skilled in the art. Therefore, the invention is not to be limited to the specific embodiment disclosed herein but is to be defined by the amended claims.

What is claimed is:

1. A self-locking insertion device for a water-transmitting wick for a potted plant adapted to be watered by said wick through capillary action from a water supply, the pot having a bottom wall in which at least one opening is formed to receive the insertion device, said device comprising:

a) a generally flat, elongated, transversely flexible and resilient main body portion formed at its upper end with a slot having a width less than the diameter of the wick whereby said wick can be frictionally retained in said slot and extended therefrom into growing media in the pot, the dimension of said main body portion at the lower end thereof being slightly greater than the diameter of the opening in said pot;

b) a flexible, resilient base portion integrally formed coplangs with said main body portion, said base portion having a lateral dimension greater than the opening in the pot, and generally flat top flanges adapted to engage the bottom surface of the bottom wall of the pot around the opening in the pot when the device is mounted, said base being formed with an enlarged opening to receive said wick and a narrow slot extending from said opening to the exterior of said base at the bottom thereof, said narrow slot being of lesser width than the diameter of said wick whereby said wick can be forced through said narrow slot into said opening and retained in said opening, and c) a pair of opposed grooves defining a neck at the juncture of said base portion and said main body portion, the width of said neck being less than the diameter of said opening in said pot, whereby said device with said wick in said upper slot and in said opening in said base can be extended upwardly through said opening in said pot, the lower end of said main body being transversely distorted to move through said pot opening, with the wall of the pot surrounding said pot opening thereafter being positioned in said grooves to lock said device in position, with one end of the wick in the growing media and the other end immersed in the water supply.

2. The device of claim 1, wherein the entrance to said upper slot is bevelled to facilitate insertion of said wick in said top slot.

3. The device of claim wherein the entrance to said narrow slot in said base is bevelled to facilitate insertion of said wick in said narrow slot.

4. The device of claim 1, further including a longitudinally extending reinforcing rib formed centrally in said main body portion to strengthen said main body portion and permit resilient distortion of the lower end thereof during insertion of said device.

5. The device of claim 4, wherein the upper end of said reinforcing rib terminates just below the inner end of said slot formed in the upper end of said main body portion.

6. The device of claim 1, wherein said main body portion and said base are integrally formed of a flexible, resilient plastic material.

7. The device of claim 1, wherein said base portion is generally semi-circular in shape, and said opening and narrow slot formed therein are generally aligned with the longitudinal axis of said main body portion.

* * * * *